US006881139B2

(12) United States Patent
Yang

(10) Patent No.: US 6,881,139 B2
(45) Date of Patent: Apr. 19, 2005

(54) DEVICE FOR OPENING OR CLOSING CAR AIR VENTS

(75) Inventor: Ho-jun Yang, Euiwang-shi (KR)

(73) Assignee: Hyundai MOBIS, Seoul (KR)

( * ) Notice: Subject to any disclaimer, the term of this patent is extended or adjusted under 35 U.S.C. 154(b) by 0 days.

(21) Appl. No.: 10/682,976

(22) Filed: Oct. 14, 2003

(65) Prior Publication Data
US 2005/0048905 A1 Mar. 3, 2005

(30) Foreign Application Priority Data
Aug. 11, 2003 (KR) ...................... 10-2003-0055386

(51) Int. Cl.[7] ................................................ B60H 1/34
(52) U.S. Cl. ..................................................... 454/155
(58) Field of Search ............................... 454/155, 322, 454/325, 326, 327

(56) References Cited
U.S. PATENT DOCUMENTS 4,610,196 A * 9/1986 Kern ......................... 454/127
4,840,114 A * 6/1989 Bauer et al. ................ 454/143
5,137,491 A * 8/1992 Ishihara et al. ............. 454/152
5,584,098 A * 12/1996 Koyama et al. .............. 16/441
6,131,336 A   10/2000 Krause et al.

FOREIGN PATENT DOCUMENTS

| FR | 2619438 | * | 2/1989 |
| JP | 62013955 | * | 1/1987 |
| JP | 63087542 A | * | 4/1988 |
| JP | 2001-063354 |  | 3/2001 |
| JP | 2002-195639 |  | 7/2002 |
| JP | 2002-274168 |  | 9/2002 |

OTHER PUBLICATIONS

English Language Abstract of JP 2002-195639.
English Language Abstract of JP 2002-274168.
English Language Abstract of JP 2001-63354.

* cited by examiner

Primary Examiner—Harold Joyce
(74) Attorney, Agent, or Firm—Greenblum & Bernstein, P.L.C.

(57) ABSTRACT

A device for opening or closing air vents of a car is provided. The device comprises a single opening/closing knob centrally installed between the left and right air vents. The opening/closing knob is linked at both sides to left and right dampers provided in the air vents, thereby allowing both the dampers to be simultaneously opened or closed according to a single operation of the opening/closing knob.

4 Claims, 5 Drawing Sheets

DEVICE FOR OPENING OR CLOSING CAR AIR VENTS

BACKGROUND OF THE INVENTION

1. Field of the Invention

The present invention relates to a device for opening or closing air vents of a car, and more particularly to a device for opening or closing air vents, which comprises a single opening/closing knob centrally installed between the left and right air vents, the opening/closing knob linked on both sides to left and right dampers so as to allow both the dampers to be simultaneously opened or closed with a single movement of the opening/closing knob, resulting in a reduction in the number of components and simplification of structure thus reducing manufacturing costs, and increasing convenience of use.

2. Description of the Related Art

Generally, a car is equipped with an air conditioning system, which generates cool or warm air, supplying it to the passenger space of the car, thereby maintaining the temperature inside the car. For discharging the air into the passenger space, a plurality of air vents are provided inside the crash pad.

Considering the structure of a conventional car air vent 10, as shown in FIG. 1, a duct 1 is provided inside the crash pad of the car, upper and lower adjustment wings 3 are installed in front of the duct 1, and left and right adjustment wings 5 are installed inward relative to the upper and lower adjustment wings 3 adjacent thereto.

Further, in order to selectively intercept the outflow of air from the air vent 10, a damper 8 is installed within the duct 1.

The damper 8 is configured so as to be controlled according movement of the opening/closing knob 20, which is installed outside the air vent 10.

In the prior art, as shown in FIG. 2, a plurality of opening/closing knobs 20 must be provided in order to individually control the damper 8 provided in each air vent 10. This results in an increase of the number of components and difficulty in the assembly process thereof increasing the cost of manufacturing. Further, the plurality of the opening/closing knobs 20 is inconvenient to users since they have to be individually operated.

SUMMARY OF THE INVENTION

Therefore, the present invention has been made in view of the above problems, and it is an object of the present invention to provide a device for opening or closing air vents of a car, which is configured so that it can simultaneously open or close both dampers of the left and right air vents using a single opening/closing knob, resulting in a reduction in the number of components and a simplification in structure, thus reducing manufacturing costs, and increasing convenience of use.

In accordance with the present invention, the above and other objects can be accomplished by the provision of a device for opening or closing a pair of left and right air vents of a car comprising: an opening/closing knob rotatably and centrally installed between a pair of left and right air vents, the air vents arranged in parallel adjacent to each other on a crash pad of the car; and a link means for allowing the dampers provided, respectively, in the left and right air vents to be simultaneously opened or closed according to the rotation of the opening/closing knob.

Preferably, the link means may include a rotating link fixed at one end thereof to the opening/closing knob so as to extend in an opposite direction to the opening/closing knob, a first link coupled at one end thereof to the other end of the rotating link by use of a pin, the first link having two left and right branches diverging from the other end thereof, and two second links coupled at each end thereof to the left and right branches of the first link by the use of pins, and at each end to adjacent side portions of the dampers provided inside the left and right air vents.

Preferably, the opposite side portions of the dampers may be rotatably coupled to the inner side surfaces of the ducts, so as to allow the dampers to rotate upward and downward within the ducts, and the ducts may be formed at their upper and lower surfaces with stoppers, the stoppers allowing the upper and lower edges of the dampers to be caught thereto, thereby preventing further rotation of the dampers.

As stated above, according to the present invention, the single opening/closing knob may be centrally installed between a pair of the left and right air vents, and the opening/closing knob may be linked with the left and right dampers, so that both the dampers can be simultaneously opened or closed according to a single movement of the opening/closing knob.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
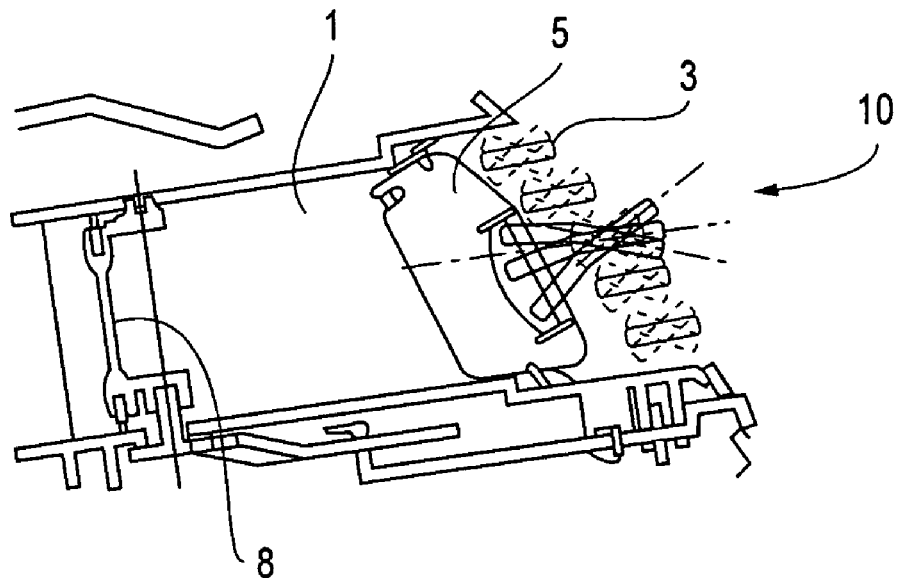
FIG. 1 is a side sectional view illustrating the structure of a general air vent.
Figure 2:
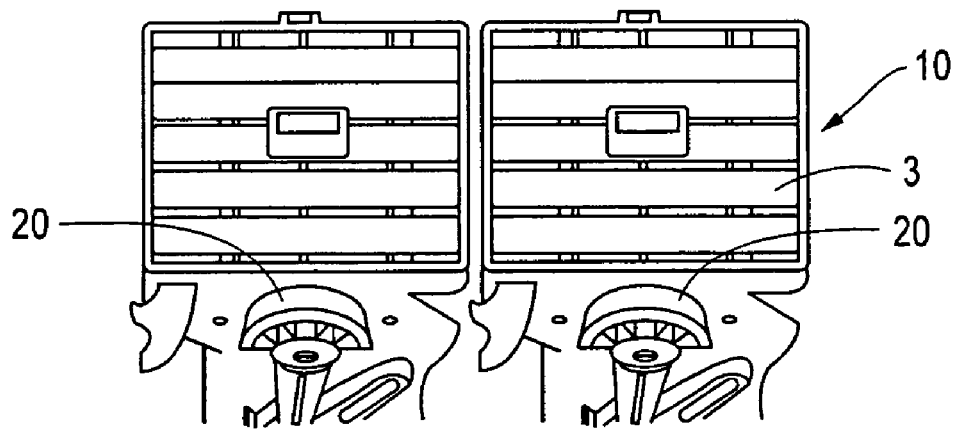
FIG. 2 is a partially broken front view illustrating the conventional opening/closing knobs installed, to both air vents.
Figure 3:
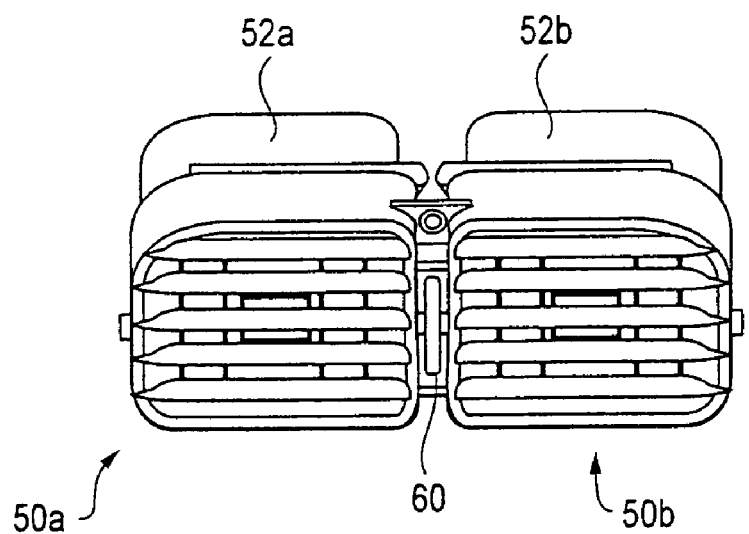
FIG. 3 is a front view illustrating an opening/closing knob installed between both air vents in accordance with the present invention.

As shown in FIG. 3, a device for opening or closing a pair of left and right air vents 50*a* and 50*b* for a car comprises a single opening/closing knob 60 centrally installed between both air vents 50*a* and 50*b*. The single opening/closing knob 60 is installed so as to simultaneously open or close the left and right dampers 90*a* and 90*b*, provided in both the air vents 50*a* and 50*b*.

Figure 4:
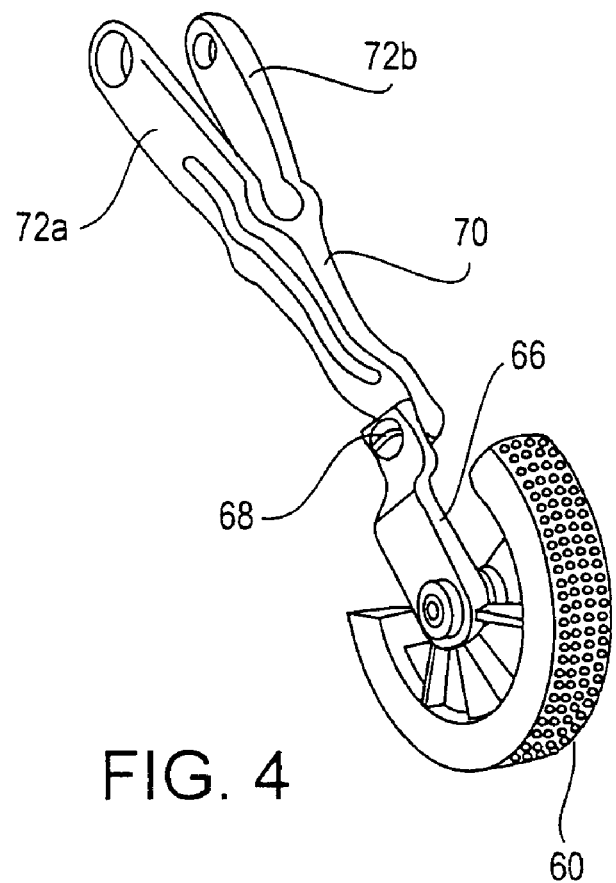
FIG. 4 is a perspective view illustrating the rear end of the opening/closing knob according to the present invention.
Figure 5:
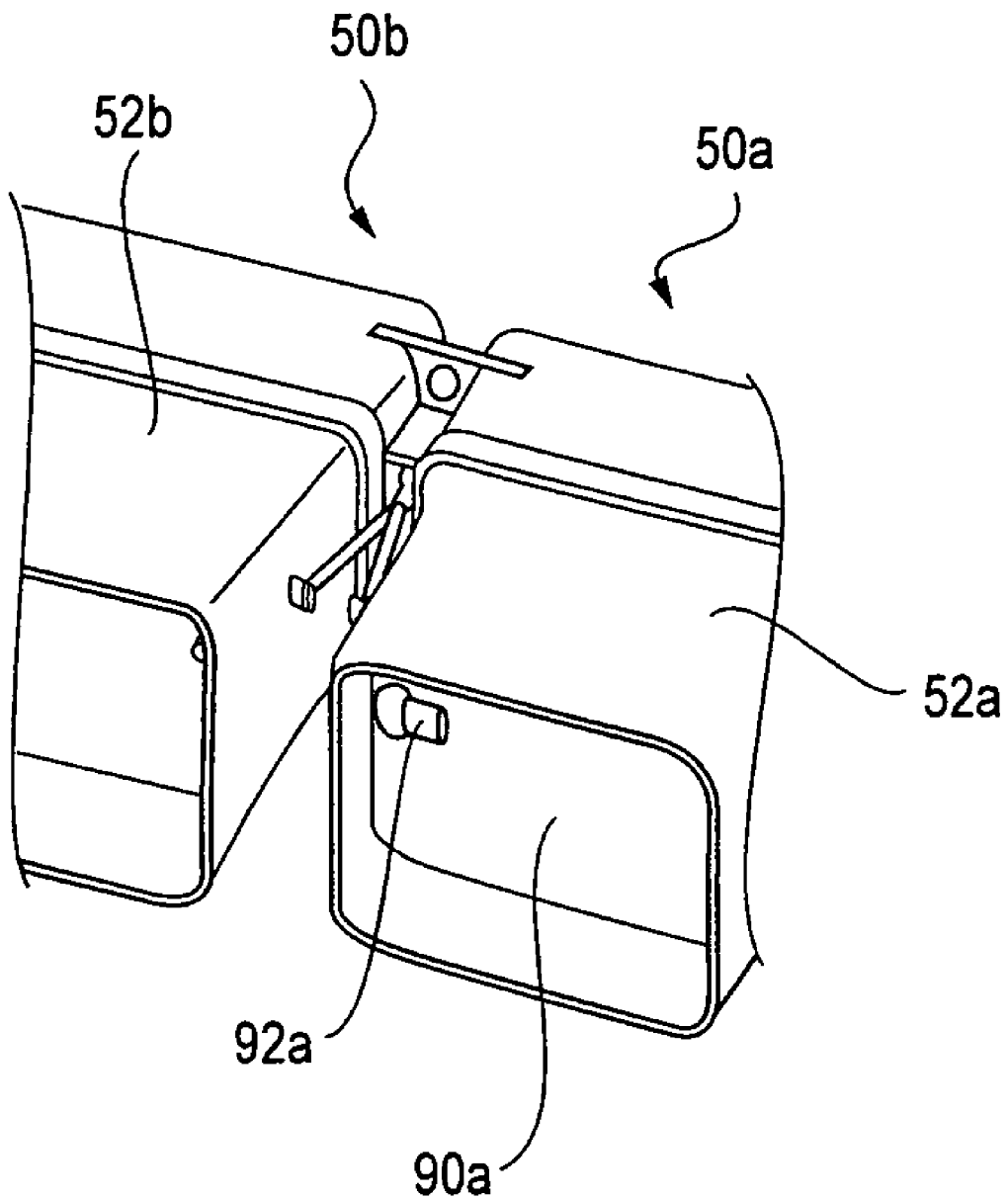
FIGS. 5 and 6 are enlarged views, illustrating the important parts of the link mechanism according to the present invention.
Figure 6:
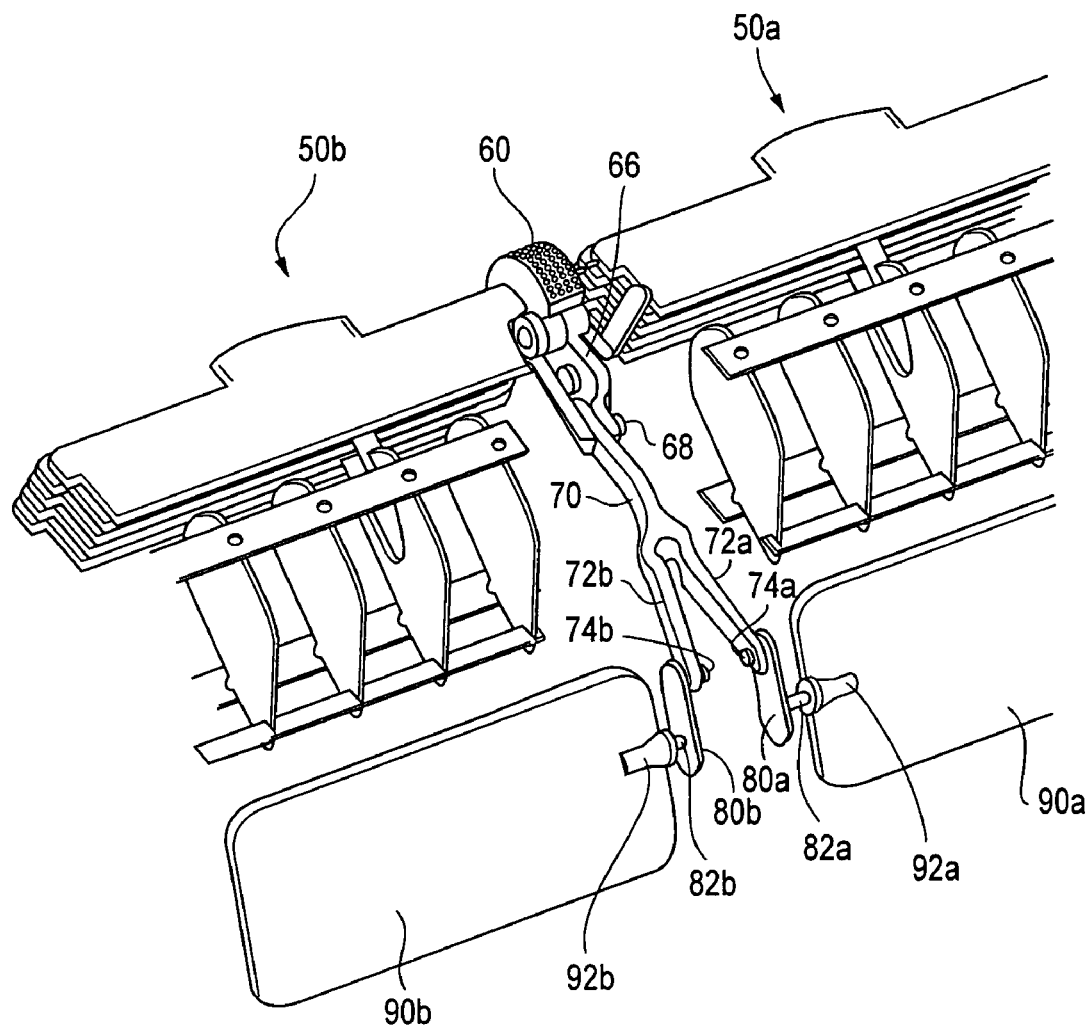

In order to achieve such simultaneous operation, the opening/closing knob 60 is connected to the left and right dampers 90*a* and 90*b* by using a link mechanism. The connecting structure between the opening/closing knob 60 and the dampers 90*a* and 90*b* will be described with reference to FIGS. 4 and 6.

The opening/closing knob 60 is rotatably supported by a shaft along the center axis so as to rotate upward and downward wherein it is exposed to the outside in order to allow operation by the user. To the rear side of the opening/closing knob 60 is connected a rotating link 66 so that the rotating link 66 is fixed at one end to the opening/closing knob 60. Therefore, as the opening/closing knob 60 rotates, the rotating link 66 simultaneously rotates upward or downward on the basis of the center axis of the opening/closing knob 60.

The other end of the rotating link 66 is coupled to a first link 70 by a pin 68. The first link 70 is shaped consisting of a single main body and two left and right branches 72a and 72b diverging from the rear end of the single main body.

The left and right branches 72a and 72b provided at the rear portion of the first link 70 are coupled to second links 80a and 80b using pins 74a and 74b, respectively. In this case, the second links 80a and 80b are engaged against the outer side surfaces of the branches 72a and 72b, respectively.

The second links 80a and 80b are formed at their distal ends with fitting protrusions 82a and 82b, respectively, which protrude vertically relative to the second links 80a and 80b in opposite outward directions. The fitting protrusions 82a and 82b penetrate adjacent side walls of the left and right ducts 52a and 52b, respectively, so as to be coupled to the side portions of the left and right dampers 90a and 90b located nearby, inside the left and right ducts 52a and 52b.

The side portions of the dampers 90a and 90b are formed with fitting bores 92a and 92b, respectively, for allowing the fitting protrusions 82a and 82b of the second links 80a and 80b to be fitted and fixed. The opposite side portions of the dampers 90a and 90b are rotatably coupled to the inner surfaces of the ducts 52a and 52b, respectively.

Now, the operation and effects of the present invention will be described in detail.

According to the configuration as stated above, it is possible to simultaneously control the dampers 90a and 90b of the left and right air vents 50a and 50b using the single opening/closing knob 60.

Figure 7:
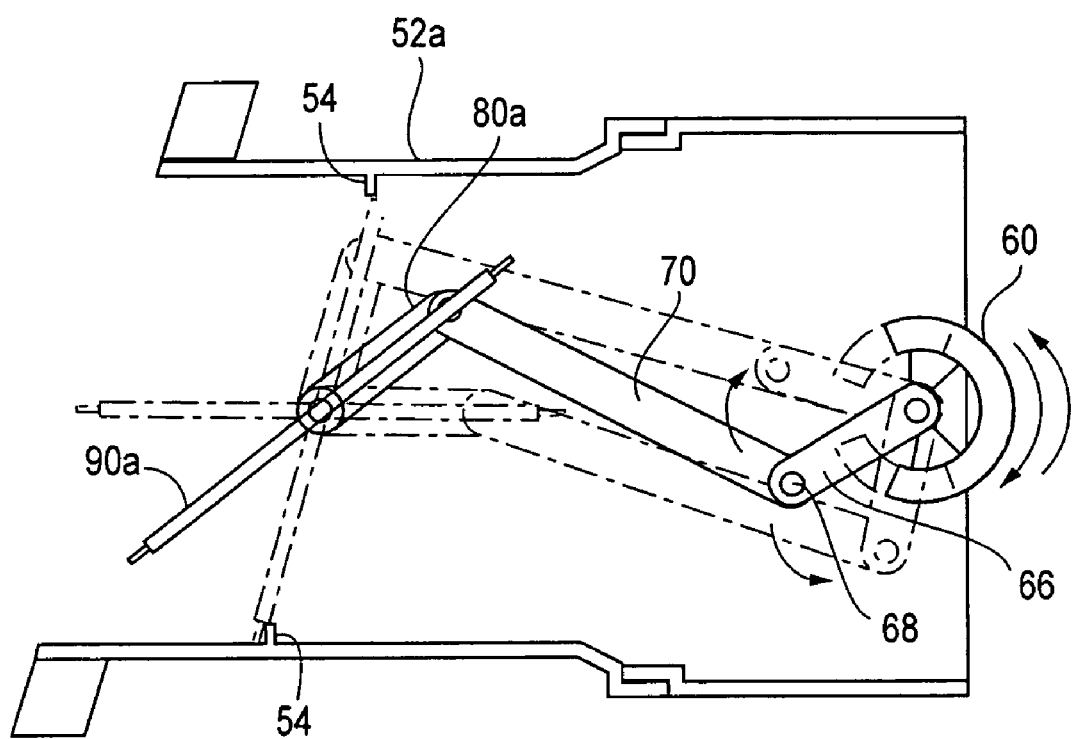
FIG. 7 is a side sectional view illustrating operation of a device for opening or closing air vents in accordance with the present invention.

As shown in FIG. 7, simultaneously with the rotation of the opening/closing knob 60 centrally located between the left and right air vents 50a and 50b, the rotating link 66 rotates upward and downward, along with the opening/closing knob 60, on the center axis of the opening/closing knob 60. In this case, the end of the rotating link 66 at the opposite side of the opening/closing knob 60 rotates along a circular path having a radius equal to the entire length thereof.

As the rotating link 66 rotates upward and downward, the first link 70 coupled to the end of the rotating link 66 by the pin 68 is pulled forward or pushed backward according to the behavior of the rotating link 66, thereby rotating the second links 80a and 80b coupled at their ends to the left and right branches 72a and 72b by using the pins 74a and 74b, respectively. As a result, the left and right dampers 90a and 90b coupled to the second links 80a and 80b rotate simultaneously inside the ducts 52a and 52b, respectively, so as to be simultaneously opened or closed.

In the present embodiment, it should be noted that the dampers 90a and 90b are gradually opened according to the upward rotation of the opening/closing knob 60, and gradually closed according to the downward rotation of the opening/closing knob 60.

Referring again to FIG. 7, the ducts 52a and 52b are formed at their upper and lower inner surfaces with stoppers 54, allowing the upper and lower edges of the dampers 90a and 90b to be caught thereto, in order to prevent the dampers 90a and 90b from rotating beyond a predetermined degree. In this case, the opening/closing knob 60 is adapted so as not to further rotate so the dampers 90a and 90b are completely closed. Therefore, the user can easily detect the opening/closing states of the dampers 90a and 90b when he/she operates the opening/closing knob 60.

As apparent from the above description, according to the present invention, a single opening/closing knob is centrally installed between both left and right air vents of a car, and the opening/closing knob is linked to both sides to left and right dampers provided in the left and right air vents, so as to allow both the dampers to be simultaneously opened or closed according to a single operation of the opening/closing knob. Therefore, it is possible to reduce the number of components and simplify the structure thereof, thereby reducing manufacturing costs, and increasing convenience of use.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for opening or closing a pair of left and right air vents of a car comprising:
   an opening/closing knob rotatably and centrally provided between the left and right air vents, the air vents being arranged in parallel adjacent to each other on a crash pad of the car;
   a linking device for allowing dampers, provided in the left and right air vents, to be simultaneously opened or closed according to the rotation of the opening/closing knob, the linking device comprising:
     a rotating link fixed at one end thereof to the opening/closing knob so as to extend in a direction away from the opening/closing knob;
     a first link coupled at one end thereof to the other end of the rotating link by a pin, the first link having left and right branches diverging from the other end thereof; and
     two second links, an end of each second link coupled to one of the left and right branches of the first link by pins, and the other end of each of the second links coupled to adjacent side portions of the dampers provided inside the left and right air vents.

2. The device as set forth in claim 1, wherein the other side portions of the dampers are rotatably coupled to inner side surfaces of the ducts, respectively, so as to allow the dampers to rotate within the ducts; and
wherein the ducts are provided with stoppers at their upper and lower surfaces, the stoppers configured to allow the upper and lower edges of the dampers to abut against the stoppers, thereby preventing further rotation of the dampers.

3. A device for opening or closing a pair of first and second air vents of a vehicle, comprising:
   an opening/closing knob rotatably and centrally installed between the first and second air vents, the air vents being provided in parallel adjacent to each other on a surface of the vehicle;
   a linking mechanism for simultaneously opening or closing dampers associated with the first and second air vents in association with the rotation of the opening/closing knob, the linking device comprising:
     a rotating link, a first end of the rotating link being fixed to the opening/closing knob to extend in a direction away from the opening/closing knob;

a first link, a first end of the first link pivotally coupled to the other end of the rotating link, the other end of the first link having first and second diverging branches; and two second links, a first end of each second link being pivotally coupled to one of the first and second branches of the first link, an opposite end of each second link being coupled to adjacent side portions of the dampers provided in the first and second air vents.

4. The device as recited in claim 3, wherein other side portions of the dampers are rotatably coupled to inner side surfaces of the ducts so as to allow the dampers to rotate within the ducts; and wherein the ducts are provided with stoppers positioned to be contacted by edges of the dampers, thereby preventing further rotation of the dampers.

* * * * *